US008468536B2

(12) United States Patent
Berger et al.

(10) Patent No.: US 8,468,536 B2
(45) Date of Patent: Jun. 18, 2013

(54) MULTIPLE LEVEL LINKED LRU PRIORITY

(75) Inventors: Deanna Postles Dunn Berger, S Hyde Park, NY (US); Ekaterina M. Ambroladze, Wappingers Falls, NY (US); Michael Fee, Cold Spring, NY (US); Diana Lynn Orf, Somerville, MA (US)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 12/822,514

(22) Filed: Jun. 24, 2010

(65) Prior Publication Data

US 2011/0321053 A1 Dec. 29, 2011

(51) Int. Cl.
*G06F 9/46* (2006.01)
*G06F 13/00* (2006.01)
*G06F 13/38* (2006.01)

(52) U.S. Cl.
USPC .......... 718/104; 718/103; 711/151; 711/152; 711/158; 711/160; 710/240; 710/244

(58) Field of Classification Search
USPC ........ 718/1–105; 711/147–160; 710/240–244
See application file for complete search history.

(56) References Cited

U.S. PATENT DOCUMENTS

| | | | |
|---|---|---|---|
| 6,965,974 B1 * | 11/2005 | Bays et al. | 711/153 |
| 7,143,219 B1 | 11/2006 | Chudhari et al. | |
| 7,302,510 B2 | 11/2007 | Fredrickson et al. | |
| 7,305,507 B2 | 12/2007 | Lavigne | |
| 7,366,854 B2 | 4/2008 | Wastlick et al. | |
| 7,631,131 B2 | 12/2009 | Chen et al. | |
| 2004/0190554 A1 | 9/2004 | Galloway | |
| 2008/0320256 A1 * | 12/2008 | Okawa et al. | 711/160 |
| 2009/0006693 A1 * | 1/2009 | Dunn et al. | 710/244 |
| 2009/0217273 A1 * | 8/2009 | Mutlu et al. | 718/101 |
| 2009/0249106 A1 * | 10/2009 | Sajayan et al. | 713/324 |

* cited by examiner

*Primary Examiner* — Abdullah Al Kawsar
(74) *Attorney, Agent, or Firm* — Cantor Colburn LLP; John Campbell

(57) ABSTRACT

A method that includes providing LRU selection logic which controllably pass requests for access to computer system resources to a shared resource via a first level and a second level, determining whether a request in a request group is active, presenting the request to LRU selection logic at the first level, when it is determined that the request is active, determining whether the request is a LRU request of the request group at the first level, forwarding the request to the second level when it is determined that the request is the LRU request of the request group, comparing the request to an LRU request from each of the request groups at the second level to determine whether the request is a LRU request of the plurality of request groups, and selecting the LRU request of the plurality of request groups to access the shared resource.

15 Claims, 5 Drawing Sheets

MULTI-LEVEL LRU REQUEST FLOWCHART

MULTIPLE LEVEL LINKED LRU PRIORITY

BACKGROUND

The present invention relates to improved data processing method, and more specifically, to method for providing multiple level linked least recently used (LRU) priority regarding resource allocation.

In a computer system, technology advancements allow more processors and other components on a single chip. This results in an increasing number of requestors vying for access to a shared resource. An LRU scheme is typically used; however it may require a large number of latches for arbitration between requestors. For example, selecting the oldest among four requestors may require six LRU latches, while selecting the oldest from 16 requestors may require 120 LRU latches. In addition, to logic complexity, physical restraints are also an issue, such as the amount of space on the chip, cycle time delay and power constraints.

One typical method has been to divide the requestors having a same priority into smaller groups. For example, dividing 16 requestors into four groups of four requestors. Therefore, six LRU latches would be used for each of the four groups to determine the LRU requestor. Then a second level of LRU is performed on the winning LRU requestor from each of the four groups with the use of six LRU latches. Although a reduced number of LRU latches are utilized with this method, a significant portion of the integrity of the LRU algorithm is lost by dividing the requestors into groups, thereby resulting in possible requestor lockouts.

SUMMARY

According to an embodiment of the present invention, a computer-implemented method is provided. The computer-implemented method includes providing least recently used (LRU) selection logic which controllably pass requests for access to computer system resources to a shared resource via a first level and a second level, determining whether a request in a request group includes active blocking conditions, presenting the request to LRU selection logic at the first level, when it is determined that the request is active, and determining whether the request is a LRU request of the request group at the first level. The computer-implemented method further includes forwarding the request to the second level when it is determined that the request is the LRU request of the request group, comparing the request to an LRU request from each of the request groups at the second level to determine whether the request is a LRU request of the plurality of request groups, and selecting the LRU request of the plurality of request groups to access the shared resource.

A computer-program product and apparatus for performing the above-mentioned method are also provided.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments of the present invention disclose using a "linked LRU" scheme which involves communicating an LRU status of a first level priority group to a second level priority group such that a given group is not flagged as the LRU group until the LRU requestor within that group has completed. According to an embodiment of the present invention, "completed" means that that specified requestor has finished its operation and has dropped its valid not merely gained access to the shared resource.

Figure 1:
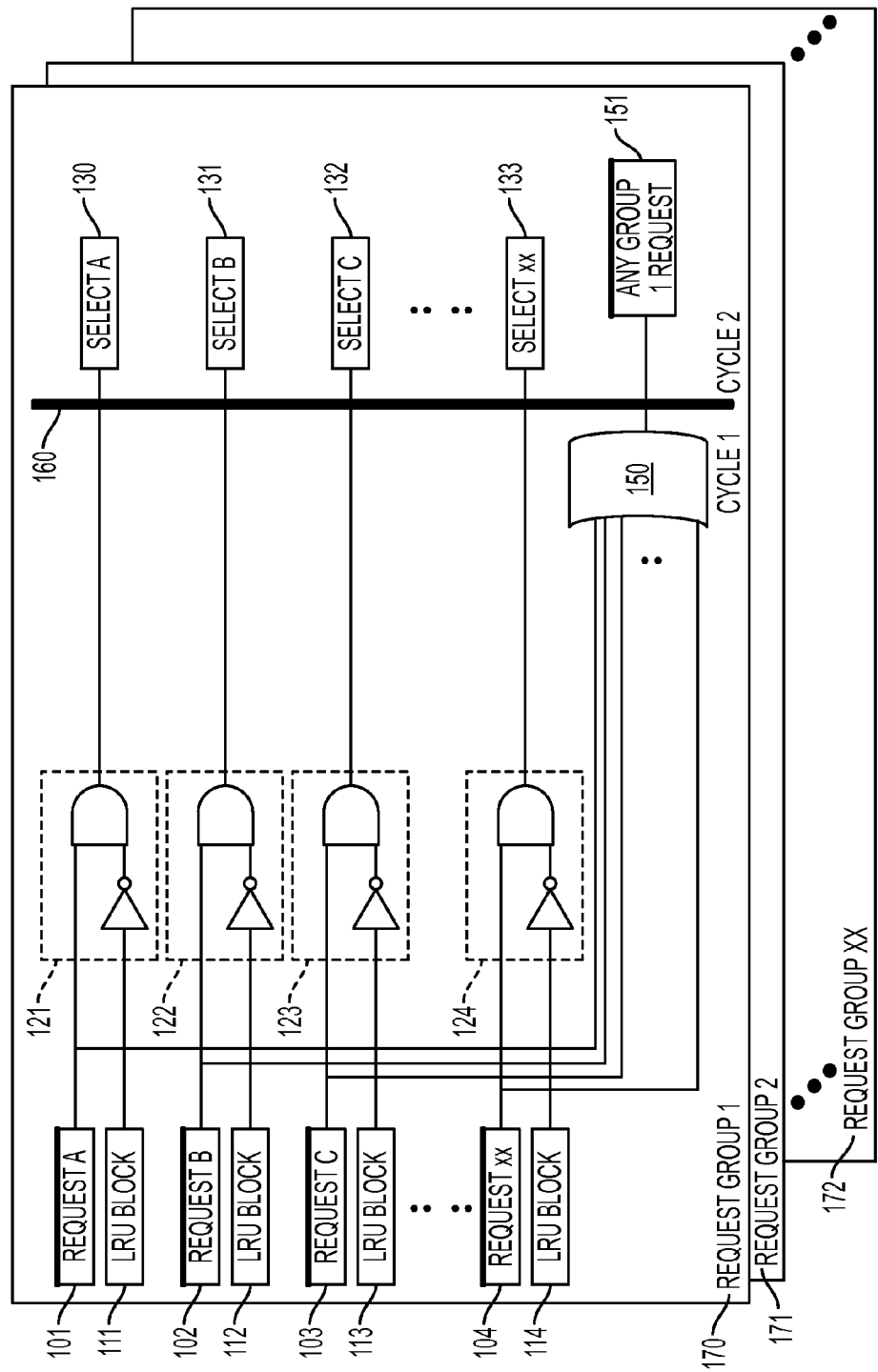
FIG. 1 is a block diagram illustrating a first level priority selection in a data processing system that can be implemented within embodiments of the present invention.
Figure 2:
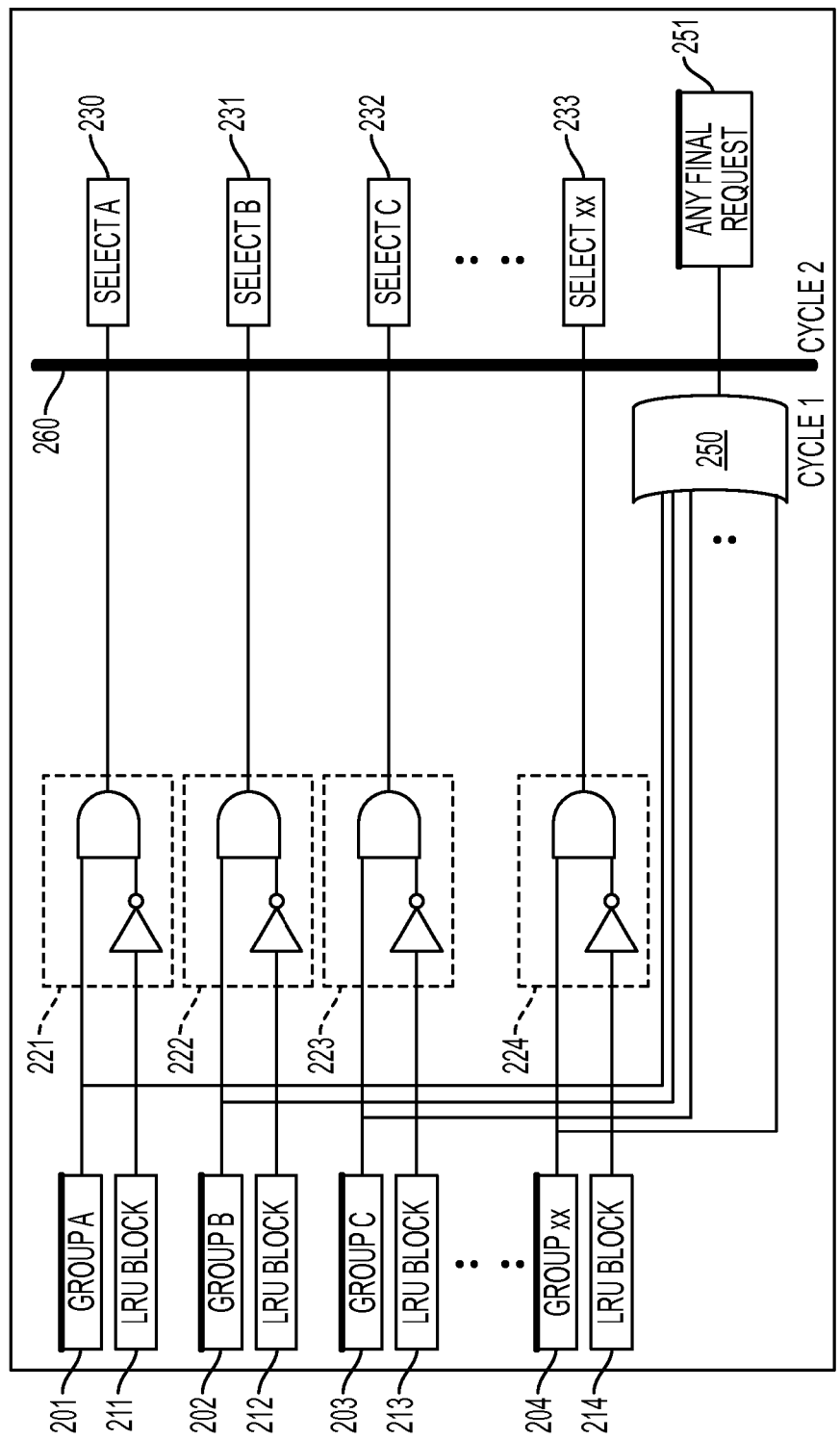
FIG. 2 is a block diagram illustrating a second level priority selection in a data processing system that can be implemented within embodiments of the present invention.

FIGS. 1 and 2 show how a large number of requestors can be divided into a number of groups with a smaller number of requestors within each group. The arbitration logic may be performed in one logical cycle or performed (as shown in the figure) across two logical cycles.

FIG. 1 is a block diagram illustrating a first level priority selection in a data processing system that can be implemented within embodiments of the present invention. As shown in FIG. 1, according to an embodiment of the present invention, a large number of requestors are divided into a plurality of Request groups 170, 171 and 172 with a predetermined number of requestors 101, 102, 103 and 104 in each group. This is the within-in group arbitration. All the within-group arbitration takes place in parallel to all other groups' within group arbitration. These requestors 101, 102, 103 and 104 may be any type of unit that requests access to system resources. For example, the requestors 101, 102, 103 and 104 may be I/O controllers, direct memory access (DMA) units, processors, and the like.

Each requestor 101, 102, 103 and 104 has a corresponding LRU block latches 111, 112, 113 and 114, respectively. The request 101, 102, 103 and 104 are gated with the corresponding LRU block latches 111, 112, 113, and 114 via gating logic 121, 122, 123 or 124.

According to an embodiment of the present invention, each requestor 101, 102, 103 and 104 turns on its corresponding select line 130, 131, 132 and 133 via its gating logic 121, 122, 123 and 124, when its request is active. The set of select lines 130, 131, 132 and 133 are mutually exclusive, one select output corresponding to each requestor input. As shown in FIG. 1, the requests 101, 102, 103 and 104 are OR-ed together via OR gate circuitry 150 to create the request lines for the second level priority selection discussed below with reference to FIG. 2. Further, in FIG. 1, any request 101, 102, 103 or 104 from Request Group 170 is selected at element 151. This request 101, 102, 103 or 104 will be active in the following cycle 160. Thus, one request is selected from each Request Group 170, 171 and 172. The select lines 130, 131, 132 and 133 are used to multiplex the data accompanying the request and stage this data to the next cycle for presentation to the second level priority multiplexing.

FIG. 2 is a block diagram illustrating a second level priority selection in a data processing system that can be implemented within embodiments of the present invention. The second level priority selection shown in FIG. 2 is similar to the first level priority selection shown in FIG. 1. As shown in FIG. 2, a plurality of groups 201, 202, 203 and 204 vie for priority to access a shared resource (e.g., a shared pipeline) 251. Similar to the first level priority selection shown in FIG. 1, each Group 201, 202, 203 and 204 has a LRU group block latch 211, 212, 213 and 214. Each group 201, 202, 203 and 204 turns on a corresponding select line 230, 231, 232 and 233 via gating logic 221, 222, 223 and 224, when its request is active. In FIG. 2, the select lines 230, 231, 232 and 233 are also mutually exclusive. As further shown in FIG. 2, the Groups 201, 202, 203 and 204 are OR-ed together via OR gate circuitry 250. Any LRU request selected from Groups 201, 202, 203 and 204 may be selected at element 251. The selected request will be active in the following cycle 260. The arbitration scheme at the second level as pertains to the use of the LRU latches is identical to that at the first level, although the number of requestors may vary. The difference between the two levels of arbitration is in the updating/set conditions of the LRU state latches, as detailed in FIG. 4.

Figure 3:
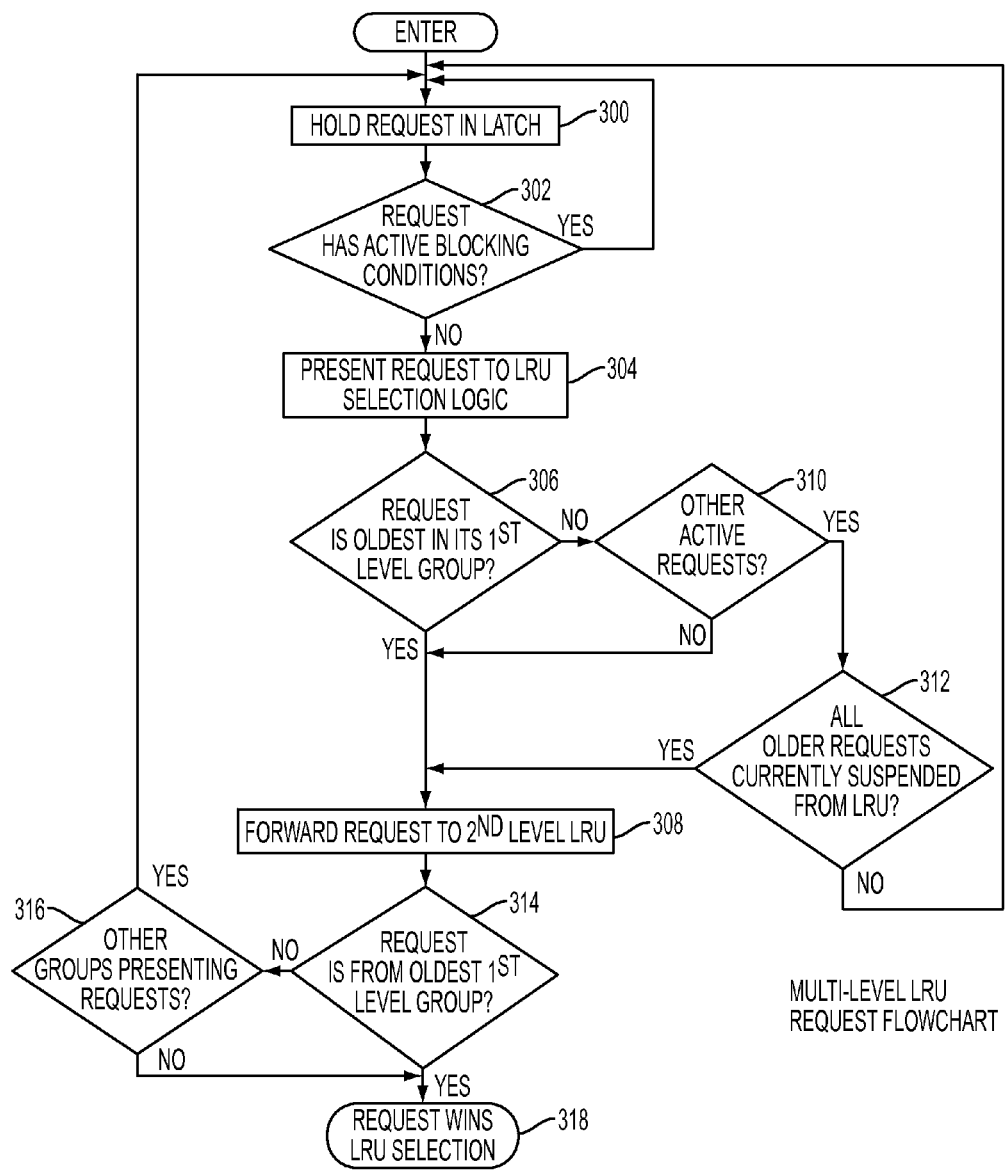
FIG. 3 is a flowchart illustrating a computer-implemented method for performing multi-level LRU request that can be implemented within embodiments of the present invention.

FIG. 3 is a flowchart illustrating a computer-implemented method for performing multi-level LRU request that can be implemented within embodiments of the present invention. As shown in FIG. 3, the process begins at operation 300 where a request is held in an LRU latch. From operation 300, the process moves to operation 302 where it is determined whether the request has active blocking conditions preventing it from being presented to the LRU selection logic. If it is determined that the request has active blocking conditions, the process returns to operation 300, where the request is held in the LRU latch. If it is determined that the request does not have active blocking conditions at operation 302, the process continues to operation 304 where the request is presented to the LRU selection device. From operation 304, the process continues where it is determined whether the request is the oldest in its first level group. If it is determined that the request is the oldest in its first level group at operation 306, the process continues to operation 308 where the request is sent to the second level priority group at operation 308. On the other hand, if it is determined at operation 306 that the request is not the oldest in its first level priority group at operation 306, the process continues to operation 310 where it is determined whether there are other active requests. If there are no other active requests, the process continues to operation 308 where the request is sent to the second level priority group. If there are other active requests, then the process continues to operation 312 where it is determined whether all the older requests are currently suspended from the LRU. If yes, then the LRU request is sent to the second level priority group at operation 308. If not, then the process returns to operation 300, where the requests are held in latch.

From operation 308, the process continues to operation 314 where it is determined whether the request is from the oldest first level priority group. If so, then the process continues to operation 318 where the request wins the LRU selection. If not, then the process moves to operation 316 where it is determined whether other groups of the plurality of request groups are presenting requests. If not, then the request from the oldest first level group wins the LRU selection. If it is determined that the other groups are presenting requests at operation 316, the process returns to operation 300 where the request are held in latch.

Figure 4:
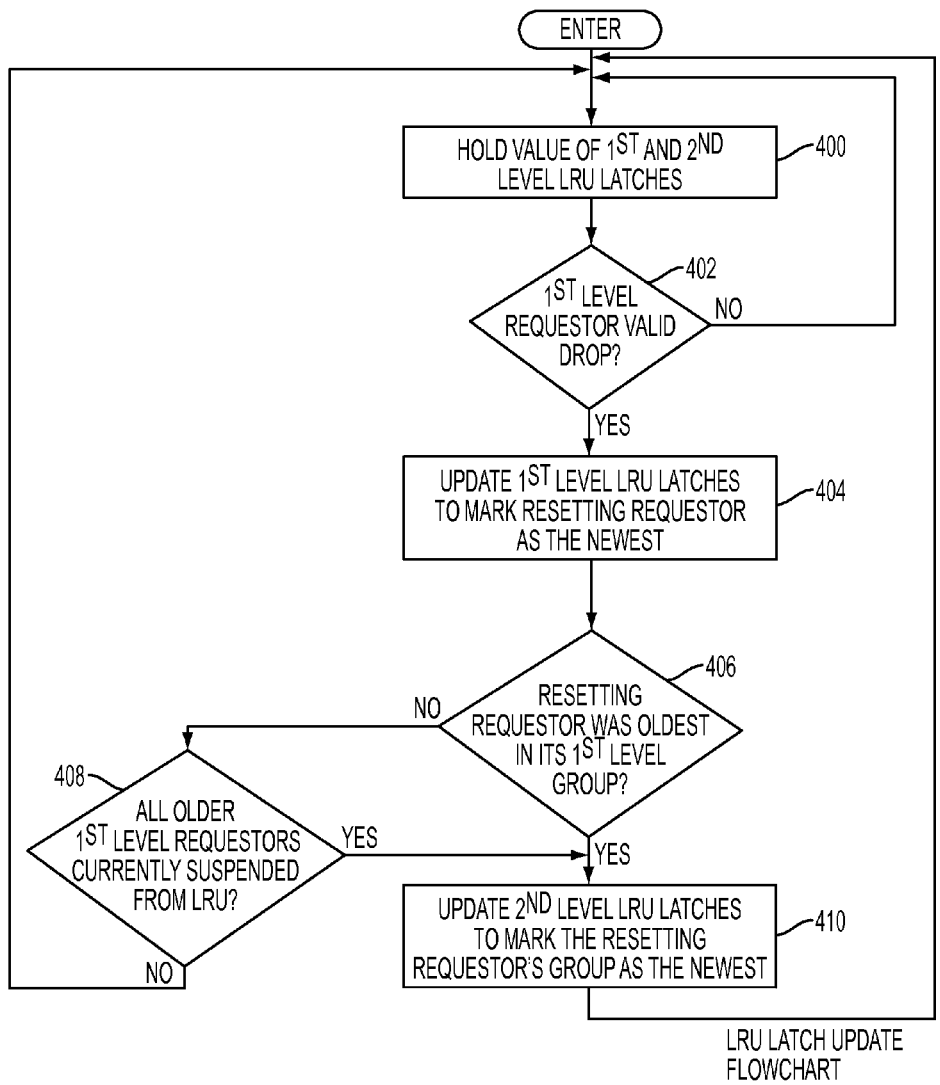
FIG. 4 is a flowchart illustrating a computer-implemented method for updating LRU latches that can be implemented within embodiments of the present invention.

FIG. 4 is a flowchart illustrating a computer-implemented method for updating LRU latches that can be implemented within embodiments of the present invention.

In operation 400, the value of the first and second level LRU latches is held. From operation 400, the process moves to operation 402, where it is determined whether the first level requestor valid has dropped. If it has dropped, the process continues to operation 404, where the LRU latches at the first level are updated to reset the requestor as the newest. If it has not dropped, the process returns to operation 400, where the value of the first and second level LRU latches is held.

From operation 404, the process continues to operation 406, where it is determines whether the reset requestor was the oldest requestor in is first level priority group. If so, then the process continues to operation 410 where the LRU latches at the second level are updated to mark the reset requestor's group as the newest. If the reset requestor is not the oldest as determined in operation 406, the process continues to operation 408 where it is determined whether all the older first level requestors in the same first level group as the reset requestor are currently suspended from LRU. If so, then the process continues to operation 410. If not, then the process returns to operation 400.

According to an embodiment of the present invention, the first level LRU latches keep track of which of the requestors within each groups are older. Thus, the LRU latches at the first level are updated with the valid dropping of the requestor. For example, if Request A (as depicted in FIG. 1) finishes its current operation and drops valid, then the associated LRU latches are reset to zero. On the other hand, the second level LRU latches keep track of which groups should be marked as older. Thus, if the first level LRU latches are pointing to a valid requestor other than the one that has completed, that group will not be updated to be marked as the most recently used group, thereby preventing the second level LRU from reporting a specific group as the most recently used, when the requestor that finished inside that group was not the oldest request in that group.

Figure 5:
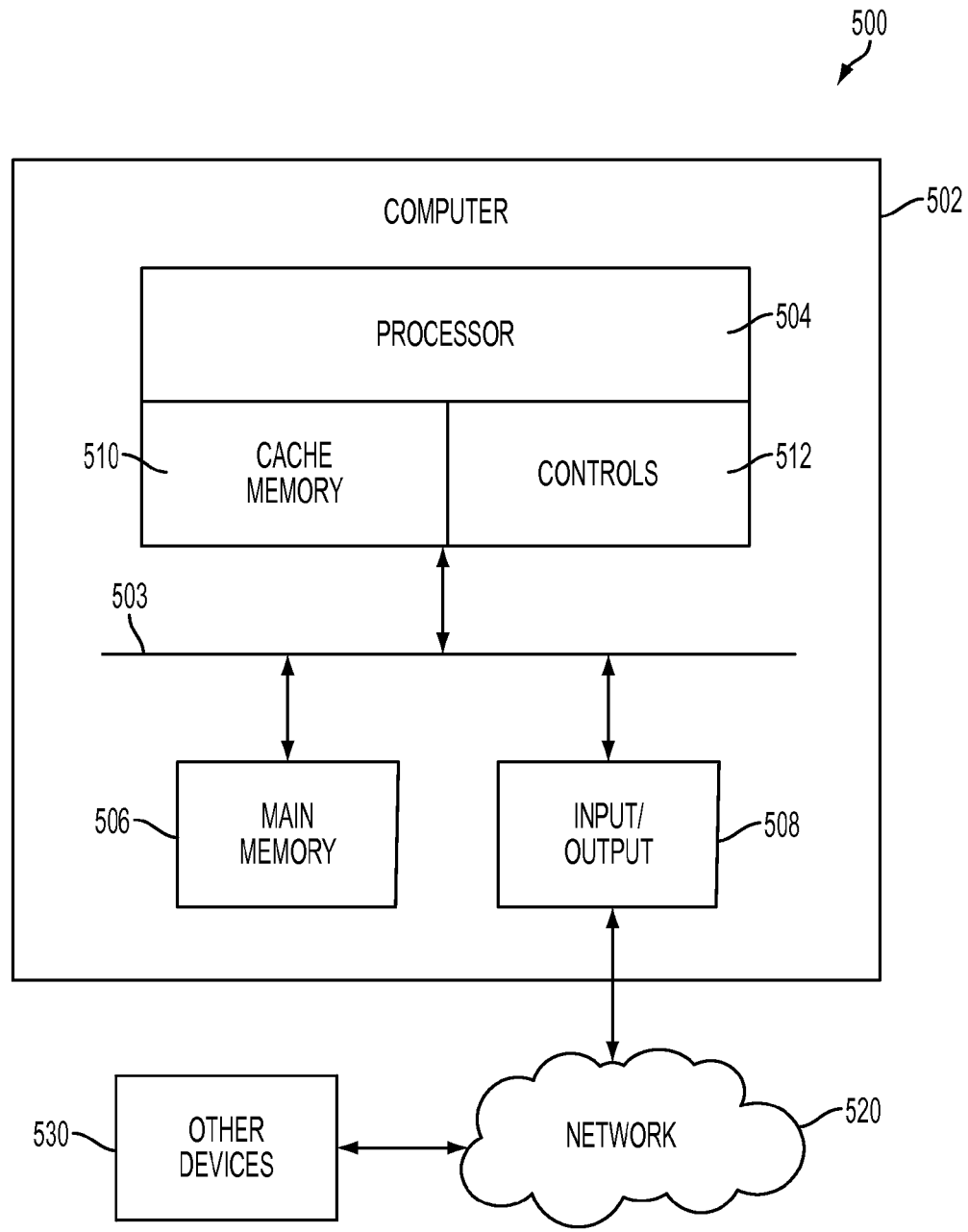
FIG. 5 is an example of a computer system configured for pipeline arbitration that may be implemented within embodiments of the present invention.

FIG. 5 is an example of a computer system configured for pipeline arbitration that may be implemented within embodiments of the present invention. The computer system 500 includes a computer 502, a network 520 and other components 530. The computer 502 and other components 530 are in communication with each other via the network 520. The computer 502 includes a processor 504, main memory 506, and input/output components 508 which are in communication via a bus 503. Processor 504 includes cache memory 510 and controls 512, which include components configured for pipeline arbitration as described in the flowcharts shown in FIGS. 3 and 4. The cache 510 may include multiple levels that are on or off-chip from processor 504. Memory 506 may include various data stored therein, e.g., instructions, software, routines, etc., which may be transferred to/from the cache 510 by controls 512 for execution by the processor 504. Input/output components 508 may include one or more components that facilitate local and/or remote input/output operations to/from computer 502 such as a display, keyboard, modem, network adapter, etc. (not depicted).

Embodiments of the present invention provide a multilevel LRU priority scheme that has the advantage of preventing starving of certain requestors within the priority group by removing the randomness of the unlinked multilevel LRU scheme.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

The flowcharts can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method comprising:
   providing least recently used (LRU) selection logic which controllably pass requests for access to computer system resources to a shared resource via a first level and a second level;
   determining whether a request in a request group includes active blocking conditions preventing the request from being presented to the LRU selection logic;
   presenting the request to LRU selection logic at the first level, when it is determined based on determining that the active blocking conditions do not exist for the request;
   determining whether the request is a LRU request of the request group at the first level, and the request group is flagged as an LRU request group based on any active LRU request in the request group being completed;
   forwarding the request to the second level based on determining that the request is the LRU request of the request group;
   comparing the request to an LRU request from each of a plurality of request groups at the second level to determine whether the request is a LRU request of the plurality of request groups;
   selecting the LRU request of the plurality of request groups to access the shared resource;
   maintaining a value of a first latching element and a second latching element at the first and second levels respectively;
   determining whether the selected LRU request at the first level has finished accessing the shared resource;
   updating a corresponding first latching element of the LRU request at the first level by resetting the corresponding first latching element of the LRU request to mark the LRU request as a newest request based on the LRU request at the first level finishing access to the shared resource;
   determining whether the marked LRU request is the oldest of the request group at the first level; and
   updating a corresponding second latching element of the request group at the second level by resetting the corresponding second latching element of the request group to mark the request group as the newest based on the marked LRU request being the oldest of the request within the request group at the first level.

2. The computer-implemented method of claim 1, wherein, based on determining that the request includes active blocking conditions, latching the request via a corresponding latching element.

3. The computer-implemented method of claim 1, further comprising
   determining whether there are other active requests based on determining that the request of the request group is not the LRU request of the request group; and
   determining whether older requests than the request of the request group exists and whether the older requests are suspended from the LRU selection logic, and forwarding the request of the request group to the second level based on determining that the older requests are suspended from the LRU selection logic.

4. The computer-implemented method of claim 1, further comprising:
   determining whether other request groups from the first level include requests;
   determining whether the request of the other request groups are active; and
   selecting the LRU request of the request groups to access the shared resource.

5. The computer-implemented method of claim 1, further comprising:
   determining whether older requests than the LRU request of the request group at the first level exists and if the older requests are suspended from the LRU selection logic, and updating a corresponding latch element of the request group at the second level to reset the request group when it is determined that the older requests are suspended.

6. A computer-program product comprising a non-transitory tangible storage medium readable by a processing circuit and storing instructions for execution by the processing circuit for performing a method comprising:

providing least recently used (LRU) selection logic which controllably pass requests for access to computer system resources to a shared resource via a first level and a second level;

determining whether a request in a request group includes active blocking conditions preventing the request from being presented to the LRU selection logic;

presenting the request to LRU selection logic at the first level, based on determining that the active blocking conditions do not exist for the request;

determining whether the request is a LRU request of the request group at the first level, and the request group is flagged as an LRU request group based on any active LRU request in the request group being completed;

forwarding the request to the second level based on determining that the request is the LRU request of the request group;

comparing the request to an LRU request from each of a plurality of request groups at the second level to determine whether the request is a LRU request of the plurality of request groups;

selecting the LRU request of the plurality of request groups to access the shared resource;

maintaining a value of a first latching element and a second latching element at the first and second levels respectively;

determining whether the selected LRU request at the first level has finished accessing the shared resource;

updating a corresponding first latching element of the LRU request at the first level by resetting the corresponding first latching element of the LRU request to mark the LRU request as a newest request based on the LRU request at the first level finishing access to the shared resource;

determining whether the marked LRU request is the oldest of the request group at the first level; and updating a corresponding second latching element of the request group at the second level by resetting the corresponding second latching element of the request group to mark the request group as the newest based on the marked LRU request being the oldest of the request within the request group at the first level.

7. The computer-program product of claim 6, wherein, based on determining that the request includes active blocking conditions, latching the request via a corresponding latching element.

8. The computer-program product of claim 6, wherein the method further comprising:

determining whether there are other active requests based on determining that the request of the request group is not the LRU request of the request group; and determining whether older requests than the request of the request group exists and whether the older requests are suspended from the LRU selection logic, and forwarding the request of the request group to the second level based on determining that the older requests are suspended from the LRU selection logic.

9. The computer-program product of claim 6, wherein the method further comprising:

determining whether other request groups from the first level include requests;

determining whether the request of the other request groups are active; and selecting the LRU request of the request groups to access the shared resource.

10. The computer-program product of claim 6, wherein the method further comprising:

determining whether older requests than the LRU request of the request group exists at the first level and if the older requests are suspended from the LRU selection logic, and updating a corresponding latch element of the request group at the second level to reset the request group when it is determined that the older requests are suspended.

11. An apparatus for determining priority selection of multiple level linked LRU arbitration, the apparatus comprising:

a processor configured to:

provide least recently used (LRU) selection logic which controllably pass requests for access to computer system resources to a shared resource via a first level and a second level;

determine whether a request of a request group includes active blocking conditions preventing the request from being presented to the LRU selection logic;

present the request to LRU selection logic at the first level, based on determining that the active blocking conditions do not exist for the request;

determine whether the request is a LRU request of the request group at the first level, and the request group is flagged as an LRU request group based on any active LRU request in the request group being completed;

forward the request to the second level determined based on determining that the request is the LRU request of the request group;

compare the request to an LRU request from each of a plurality of request groups at the second level to determine whether the request is a LRU request of the plurality of request groups;

select the LRU request of the plurality of request groups to access the shared resource;

maintain a value of a first latching element and a second latching element at the first and second levels respectively;

determine whether the selected LRU request at the first level has finished accessing the shared resource;

update a corresponding first latching element of the LRU request at the first level by resetting the corresponding first latching element of the LRU request to mark the LRU request as a newest request based on the LRU request at the first level finishing access to the shared resource;

determine whether the marked LRU request is the oldest of the request group at the first level; and update a corresponding second latching element of the request group at the second level by resetting the corresponding second latching element of the request group to mark the request group as the newest based on the marked LRU request being the oldest of the request within the request group at the first level.

12. The apparatus of claim 11, wherein based on determining that the request includes active blocking conditions, latching the request is via a corresponding latching element.

13. The apparatus of claim 11, wherein the processor is further configured to:

determine whether there are other active requests based on determining that the request of the request group is not the LRU request of the request group; and determine whether older requests than the request of the request group exists and whether the older requests are suspended from the LRU selection logic, and forward the request of the request group to the second level based on determining that the older requests are suspended from the LRU selection logic.

14. The apparatus of claim 11, wherein the processor is further configured to:

determine whether other request groups from the first level include requests;

determine whether the request of the other request groups are active; and select the LRU request of the request groups to access the shared resource.

15. The apparatus of claim 11, wherein processor is further configured to:

determine whether older requests than the LRU request of the request group exists at the first level and if the older requests are suspended from the LRU selection logic, and updating a corresponding latch element of the request group at the second level to reset the request group when it is determined that the older requests are suspended.

* * * * *